United States Patent [19]

Negishi

[11] Patent Number: 5,691,796
[45] Date of Patent: Nov. 25, 1997

[54] OPHTHALMIC MOUNTING FOR BIFOCAL LENSES

[76] Inventor: Tohru Negishi, 264-2, Bonsai-cho, Omiya-shi, Saitama-ken, Japan

[21] Appl. No.: 739,205

[22] Filed: Oct. 29, 1996

[30] Foreign Application Priority Data

Nov. 2, 1995 [JP] Japan .................................. 7-320932

[51] Int. Cl.⁶ .............................. G02C 7/06; G02C 5/12
[52] U.S. Cl. .............................. 351/55; 351/137
[58] Field of Search .............................. 351/55, 54, 65, 351/78, 80, 136, 137, 138, 41

[56] References Cited

U.S. PATENT DOCUMENTS 4,280,758 7/1981 Flader et al. .
4,896,957 1/1990 Speer .................................. 351/137

FOREIGN PATENT DOCUMENTS

| 0 032 475 | 7/1981 | European Pat. Off. . |
| 0 273 650 | 7/1988 | European Pat. Off. . |
| 0 374 046 | 6/1990 | European Pat. Off. . |
| 2 652 167 | 3/1991 | France . |
| 35 15 741 | 9/1985 | Germany . |
| 63-122321 | 8/1988 | Japan . |

*Primary Examiner*—Hung X. Dang
*Attorney, Agent, or Firm*—Wenderoth, Lind & Ponack

[57] ABSTRACT

An ophthalmic mounting includes a pair of pad supporting arms connected to an eyeglass frame, and a pair of hollow nose pads including a pair of elongated guide openings, and a pair of sliding members carried by the pad supporting arms and freely slid along the guide openings such that at least two different focal fields can be moved into and out of desired position of use. A pair of movable magnets are attached to the sliding members. A pair of fixed magnets are attached to the upper ends of the nose pads and adapted to cooperate with the movable magnets so as to lock the eyeglass frame or lenses in a raised position. Another pair of fixed magnets are attached to the lower ends of the nose pads and adapted to cooperate with the movable magnets so as to lock the eyeglass frame or lenses in a lowered position.

16 Claims, 5 Drawing Sheets

OPHTHALMIC MOUNTING FOR BIFOCAL LENSES

BACKGROUND OF THE INVENTION

1. Field of the Invention

The present invention relates to improvements in ophthalmic mountings for use with bifocal lenses.

2. Description of the Related Art

Many attempts have been made to raise or lower eyeglass lenses before the eyes of a user so that two or more different focal fields of the lenses can be moved into and out of desired position of use, but most of them were difficult to operate.

Japanese Laid-Open Utility Model Publication No. 63-122321, for example, discloses an ophthalmic mounting for bifocal lenses, which permits two focal fields of the lenses to be moved to the most comfortable position of use for near or distance vision. The mounting includes a sleeve secured to each nose pad by a pin, and a sliding member secured to each eyeglass rim. The sliding member is in the form of a rectangular frame and has a slightly arcuate spring. When the sliding member is inserted into the sleeve, the spring is urged against the pin so as to allow the near vision fields of the bifocal lenses may be raised or lowered, as desired and retain their positions of adjustment during use. A problem with this particular mounting is such that the eyeglass frames or rims can not smoothly be moved to desired position of use due to frictional force constantly developed between the spring and the pin.

Accordingly, it is an object of the present invention to provide an ophthalmic mounting for bifocal lenses, which enables two different focal fields of the lenses to be smoothly moved to the most comfortable position of use for near or distance vision.

SUMMARY OF THE INVENTION

In order to achieve the foregoing objects, there is provided an ophthalmic mounting for bifocal lenses, which comprises a pair right and left lens holding means, a pair of hollow right and left nose pads including a corresponding pair of elongated right and left guide openings, support means for slidably supporting the right and left nose pads relative to the right and left lens holding means, support means extending from the right and left lens holding means and including a pair of right and left sliding members freely slid along the right and left guide openings such that at least two different focal fields can be moved into and out of desired position of use; and locking means including a pair of right and left first locking elements located within the right and left nose pads and moved with the right and left sliding members, and a pair of right and left second locking elements located at the upper ends of the right and left nose pads and adapted to cooperate with the right and left first locking elements so as to lock the right and left lens holding means in a raised position.

In a preferred embodiment, the locking means further comprises a pair of right and left third locking elements located at the lower ends of the right and left nose pads and adapted to cooperate with the right and left first locking elements so as to lock the right and left lens holding means in a lowered position.

Preferably, the right and left nose pads include a corresponding pair of substantially cylindrical right and left bores communicated with the right and left guide openings. The right and left sliding members include a corresponding pair of right and left sliding plates moved along the right and left guide openings, and a corresponding pair of substantially cylindrical right and left sleeves connected to the right and left sliding plates and slidably received within the right and left bores. The right and left first locking means are in the form of a cylindrical rod and extend through the right and left sleeves.

Preferably, the right and left nose pads include a corresponding pair of substantially cylindrical right and left bores communicated with the right and left guide openings. The right and left sliding members include a corresponding pair of right and left sliding plates moved along the right and left guide openings, and a corresponding pair of substantially cylindrical right and left sleeves connected to the right and left sliding plates and slidably received within the right and left bores. The locking means includes a pair of right and left leaf springs, and a pair of right and left fulcrum members attached to the right and left nose pads so as to swingably supporting the right and left leaf springs within the right and left nose pads. The right and left first locking elements include a corresponding pair of right and left recesses formed in the right and left sleeves. The right and left second locking elements include a corresponding pair of right and left first projections formed in the upper ends of the right and left leaf springs and adapted to engage with the right and left recesses so as to lock the right and left lens holding means in the raised position.

The locking means further comprises a pair of right and left fourth locking elements including a corresponding pair of right and left second projections formed in the lower ends of the right and left leaf springs and adapted to engage with the right and left recesses so as to lock the lens holding means in a lowered position.

The right fulcrum member may be attached to the right leaf spring at a position closer to the upper end of the right leaf spring than the lower end of the right leaf spring, and the left fulcrum member may be attached to the left leaf spring at a position closer to the lower end of the left leaf spring than the upper end of the left leaf spring. Alternatively, the right fulcrum member may be attached to the right leaf spring at a position closer to the lower end of the right leaf spring than the upper end of the right leaf spring, and the left fulcrum member may be attached to the left leaf spring at a position closer to the upper end of the left leaf spring than the lower end of the left leaf spring.

BRIEF DESCRIPTION OF THE DRAWINGS

The above and other objects and advantages of the present invention will become apparent from the following description when taken in conjunction with the accompanying drawings, in which.

DESCRIPTION OF THE PREFERRED EMBODIMENTS

Figure 1:
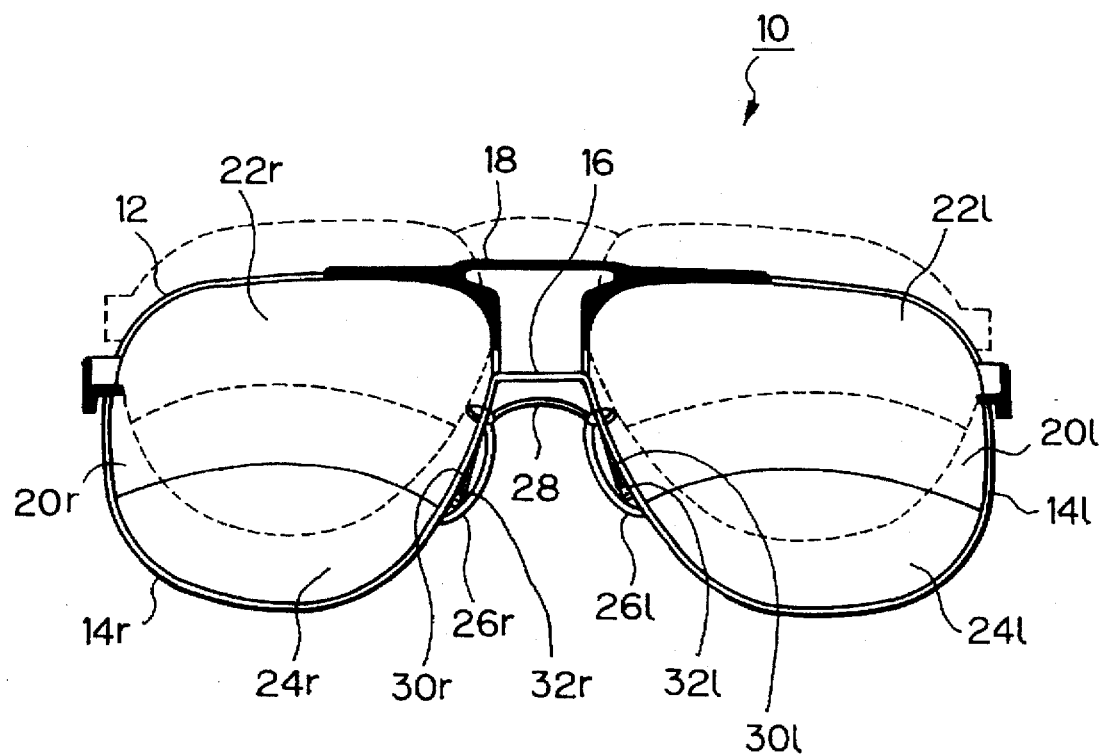
FIG. 1 is a front view of eyeglasses incorporating an ophthalmic mounting according to one embodiment of the present invention.

Like reference numerals designate like parts throughout the several views of the drawings.

Referring first to FIG. 1, eyeglasses are generally designated by the reference numeral 10 and include a suitable frame 12. In the illustrated embodiment, the frame 12 has a pair of generally rectangular right and left rims 14r, 14l joined by a main bridge 16 and an auxiliary bridge 18, and a corresponding pair of temples (not shown) swivelled at their ends on the rims 14r, 14l. The rims 14r, 14l are adapted to support a corresponding pair of right and left lenses 20r, 20l. The right and left lenses 20r, 20l are commercially known as bifocal lenses and have distance fields 22r, 22l and near vision fields 24r, 24l. It is to be understood, however, that the present invention may also be used with lenses having three or more focal fields, as desired. The eyeglasses 10 have a pair of right and left nose pads 26r, 26l joined by a pad bridge 28. The nose pads 26r, 26l are ellipsoidal in shape and have flat front faces and arcuate rear faces (see FIG. 2B). It is, of course, to be understood that the nose pads may take any shape.

Figure 2A:
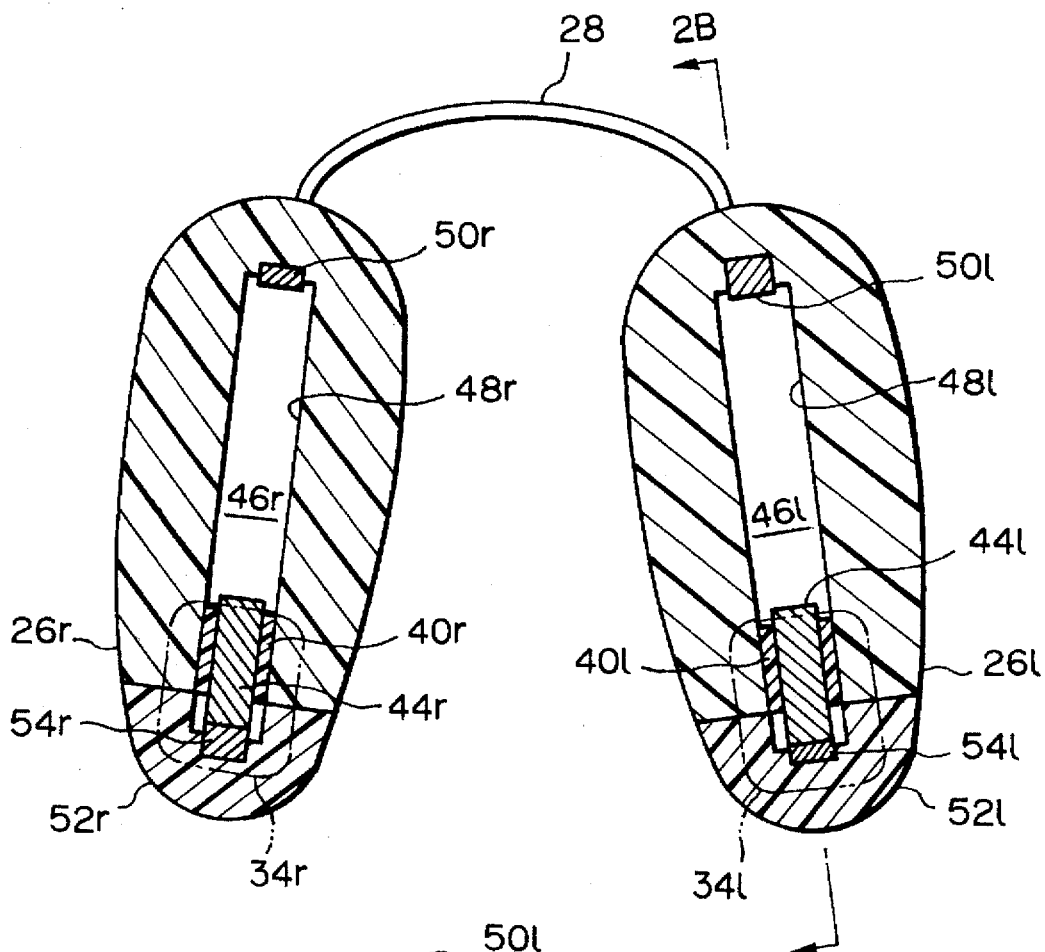
FIG. 2A is an enlarged front view, in section, of the ophthalmic mounting when the lenses the eyeglasses are in their lowered position.
Figure 2B:
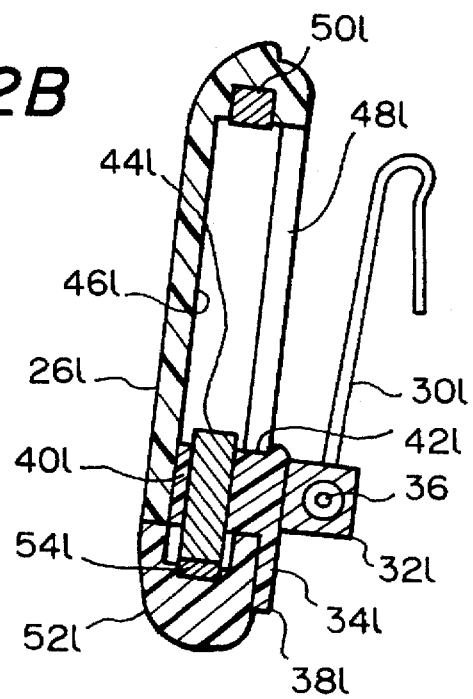
FIG. 2B is a sectional view of the ophthalmic mounting taken on the line 2B—2B in FIG. 2A.

Referring to FIGS. 2A and 2B, there is illustrated an ophthalmic mounting according to one embodiment of the present invention and adapted to move the two different focal fields upwardly or downwardly to two different positions of use before the eyes of a user. Specifically, the ophthalmic mounting comprises a pair of generally inverted U-shaped pad supporting arms 30r, 30l extending rearwardly from the rims 14r, 14l and a pair of brackets 32r, 32l welded or otherwise secured to the pad supporting arms 30r, 30l. The pad supporting arms 30r, 30l and the brackets 32r, 32l are both made of metal. A pair of sliding members 34r, 34l are made of plastic and secured to the brackets 32r, 32l by screws 36. The sliding members have flat sliding plates 38r, 38l movable on the front faces of the nose pads 26r, 26l, and cylindrical sleeves 40r, 40l connected to the sliding plates 38r, 38l through connecting plates 42r, 42l. A pair of movable magnets 44r, 44l are cylindrical in shape and extend through the sleeves 40r, 40l. The nose pads 26r, 26l have cylindrical bores 46r, 46l to slidably receive the corresponding sleeves 40r, 40l. A pair of elongated guide openings 48r, 48l are formed in the front faces of the nose pads 26r, 26l and adapted to guide the sliding members 34r, 34l along the length of the nose pads 26r, 26l. The nose pads 26r, 26l have a corresponding pair of upper fixed magnets 50r, 50l partly embedded in the upper ends of the nose pads 26r, 26l. A pair of end retainers 52r, 52l are attached to the lower ends of the nose pads 26r, 26l and have a corresponding pair of lower fixed magnets 54r, 54l. Preferably, the upper magnet 50l of the left nose pad 26l is thicker than and has a greater magnetic force than the upper magnet 50r of the right nose pad 26r. Also, the lower magnet 54l within the left end retainer 52l is preferably thinner than and has a lesser magnetic force than the lower magnet 54r within the right end retainer 52r.

Figure 2C:
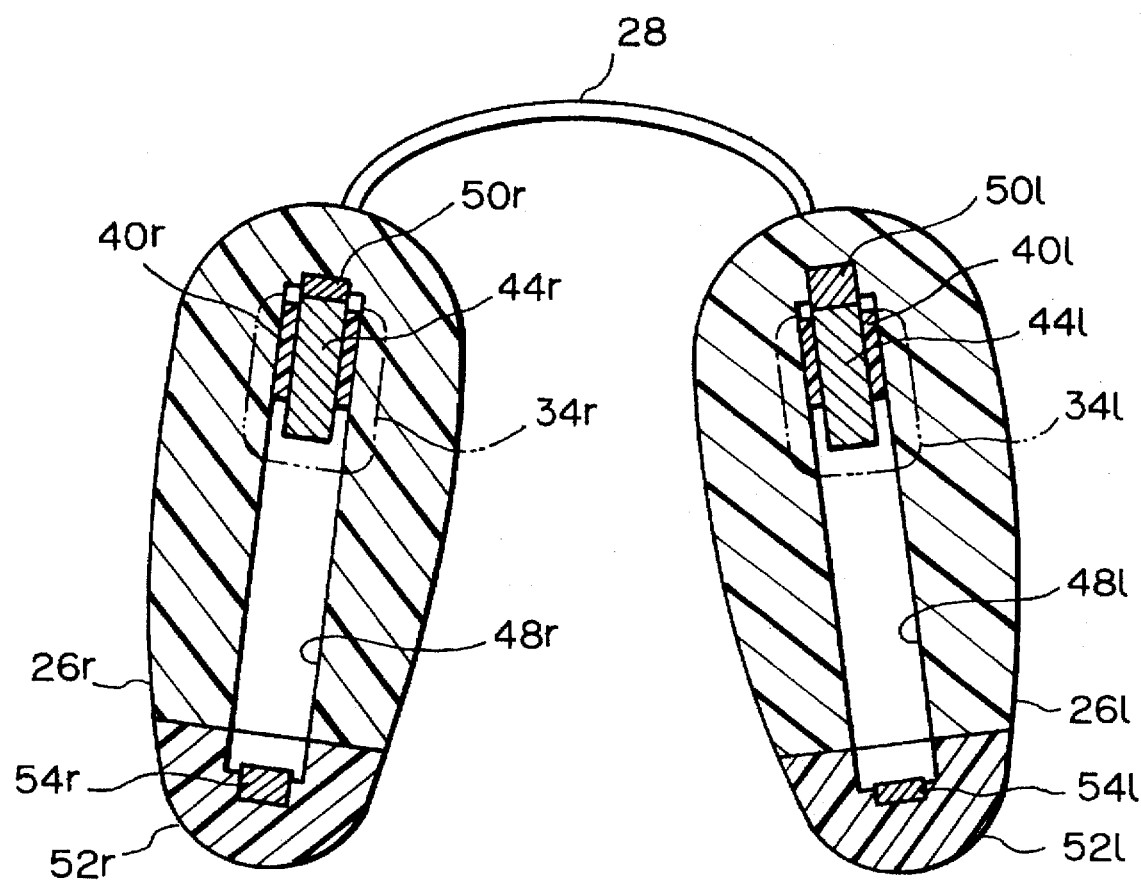
FIG. 2C is a view similar to FIG. 2A, but showing the ophthalmic mounting when the lenses are in their upper position.

When the lenses 20r, 20l are in their lowered position, as shown by solid line in FIG. 1, for distance vision, the movable magnets 44r, 44l are attached to the lower magnets 54r, 54l as shown in FIGS. 2A and 2B. To change from distance vision to near vision, an upward pressure is exerted on the frame 12 so as to release the movable magnets 44r, 44l from the lower magnets 54r, 54l. The sleeves 44r, 44l are then substantially nonfrictionally moved within the bores 46r, 46l while the sliding members 34r, 34l are guidably slid on the front faces of the nose pads 26r, 26l. When the movable magnets 44r, 44l are attached to the upper magnets 50r, 50l as shown in FIG. 2C, the lenses 20r, 20l are firmly retained in their raised position as shown by broken line in FIG. 1. To return the lenses 20r, 20l to their lowered position, a relatively strong downward pressure is first exerted on the left side of the frame 12 so as to release the movable magnet 44l from the upper magnet 50l of the left nose pad 26l. This is because the upper magnet 50l of the left nose pad 26l has a greater locking or magnetic force than the upper magnet 50r of the right nose pad 26r. A relatively week downward force is then exerted on the right side of the frame 12 to release the movable magnet 44r from the upper magnet 50r of the right nose pad 26r. In this way, the movable magnets 44r, 44l can easily be released from the upper magnets 50r, 50l to allow the both lenses 20r, 20l to be simultaneously moved from their raised position toward their lowered position. If the upper magnets 50r, 50l of the right and left nose pads 26r, 26l have the same magnetic force, then the same pressure must constantly be exerted on the right and left sides of the frame 12. If not, one of the movable magnets may be left attached to the fixed magnet.

Figure 3:
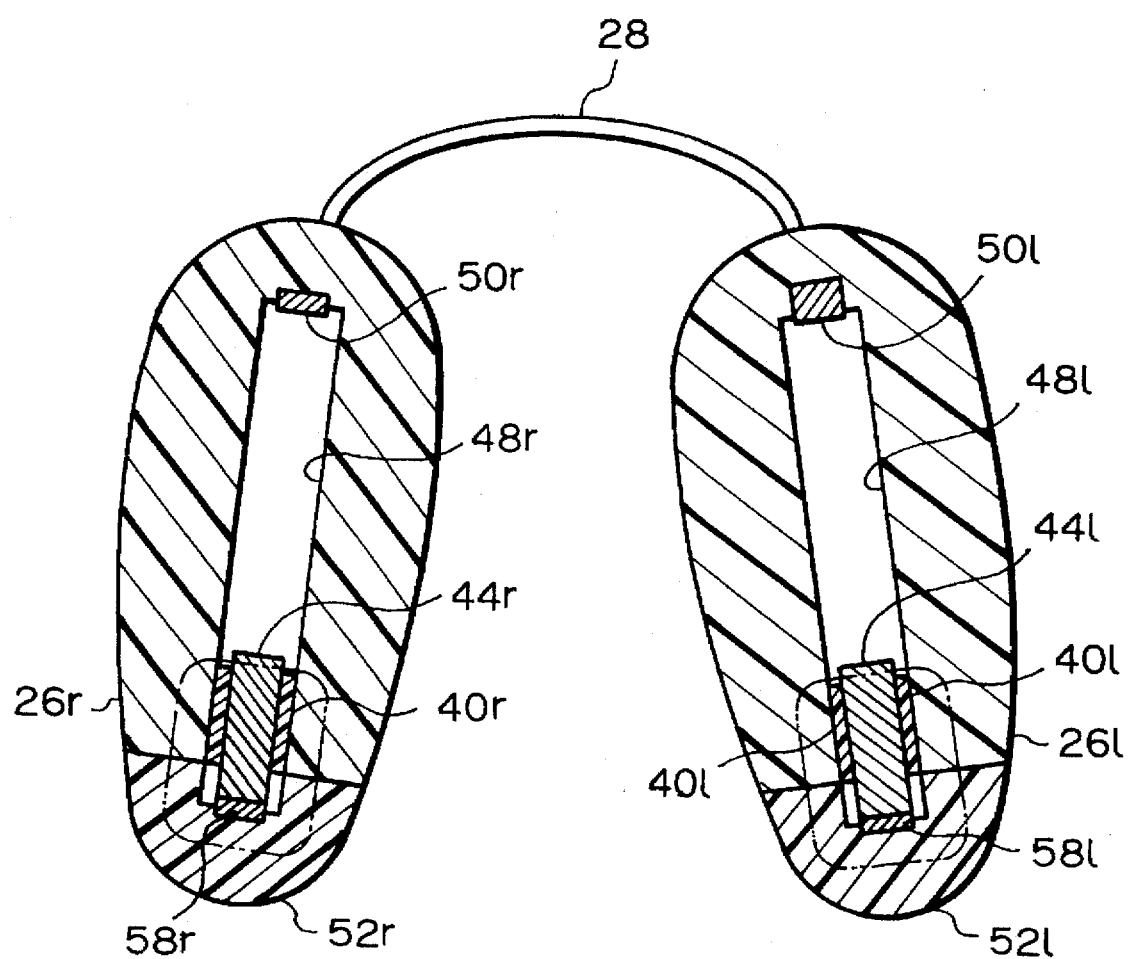
FIG. 3 is an enlarged front view, in section, of a modified ophthalmic mounting.

As mentioned earlier, the upper magnet 50l of the left nose pad 26l is thicker than the upper magnet 50r of the right nose pad 26r. Alternatively, the upper magnet 50r of the right nose pad 26r may be thicker than the upper magnet 50l of the left nose pad 26l. Also, either the upper magnets 50r, 50l or the movable magnets 44r, 44l may be made of a suitable magnetic material and constitute locking elements. As shown in FIG. 3, lower magnets 58r, 58l may have the same size or magnetic force. Also, the lower magnets may be made of a suitable magnetic material and constitute locking elements. It is to be understood that the lower magnets may be omitted since the lenses can be retained in their lowered position under gravity.

Figure 4A:
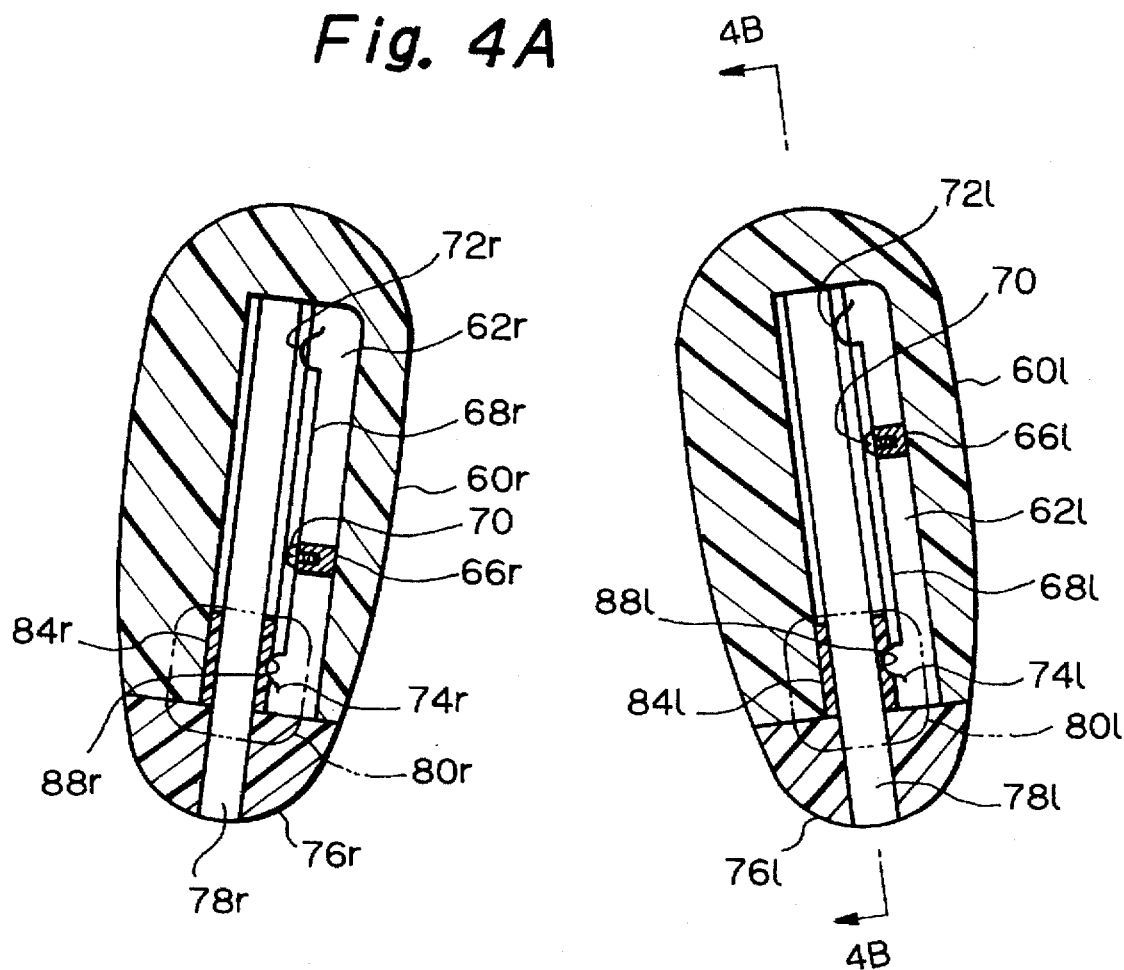
FIG. 4A is an enlarged front view, in section, of an ophthalmic mounting according to another embodiment of the present invention.
Figure 4B:
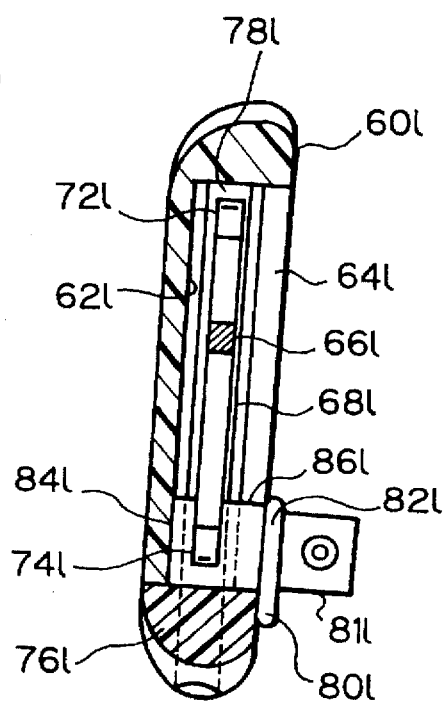
FIG. 4B is a sectional view of the ophthalmic mounting taken on the line 4B—4B in FIG. 4A.

FIGS. 4A and 4B illustrate an ophthalmic mounting according to another embodiment of the present invention. Specifically, a pair of separate right and left nose pads 60r, 60l include a corresponding pair of right and left bores 62r, 62l extending along the length of the nose pads, and a corresponding pair of elongated guide openings 64r, 64l (only the right guide opening is shown in FIG. 4) communicated with the bores 62r, 62l, respectively. A pair of right and left fulcrum members 66r, 66l are attached to the inner wall of the nose pads 60r, 60l. A pair of leaf springs 68r, 68l extend within the bores 62r, 62l and are secured to the fulcrum members 66r, 66l by screws 70. The leaf springs 68r, 68l have upper projections 72r, 72l and lower projections 74r, 74l at their opposite ends. A pair of right and left end retainers 76r, 76l are attached to the lower ends of the nose pads 60r, 60l and include a corresponding pair of guide rods 78r, 78l. The guide rods 78r, 78l extend substantially vertically from the end retainers 76r, 76l to the upper ends of the nose pads 60r, 60l. The ophthalmic mounting further includes a pair of sliding members 80r, 80l attached to brackets 81r, 81l which are structurally similar to those shown in FIG. 2 and will not be described herein. As in the previous embodiment, the sliding members 80r, 80l include sliding plates 82r, 82l movable on the front faces of the nose pads 60r, 60l, and cylindrical sleeves 84r, 84l connected to the sliding plates 82r, 82l through connecting plates 86r, 86l. The sleeves 84r, 84l are movable along the guide rods 78r, 78l and have recesses 88r, 88l selectively engageable with the upper and lower projections of the leaf springs 68r, 68l. Preferably, the left fulcrum member 66l is located within the left nose pad 60*l* such that the distance between the upper projection 72*l* and the fulcrum member 68*l* is less than that between the lower projection 74*l* and the fulcrum member 66*l*. Also, the right fulcrum member 66*r* is preferably located within the right nose pad 60*r* such that the distance between the upper projection 72*r* and the fulcrum member 66*r* is greater than that between the lower projection 74*r* and the fulcrum member 66*r*. This arrangement allows the upper and lower projections to provide different locking forces.

When the lenses 20*r*, 20*l* are in their lowered position, the lower projections 74*r*, 74*l* of the right and left leaf springs 68*r*, 68*l* are lockingly engaged with the recesses 88*r*, 88*l* of the sleeves 84*r*, 84*l*. To change from distance vision to near vision, a relatively strong upward pressure is first exerted on the left side of the frame 12 so as to disengage the lower projection 74*l* of the left leaf spring 68*l* from the recess 88*l* of the left sleeve 84*l*. This is because the lower projection 74*l* of the left leaf spring 68 provides a greater locking force than that of the right leaf spring 68*r* due to the difference in distance between the lower projections 74*r*, 74*l* and their associated fulcrum members 66*r*, 66*l*. A relatively week upward pressure is then exerted on the right side of the frame 12 so as to disengage the lower projection 74*r* of the right leaf spring 68*r* from the recess 88*r* of the right sleeve 84*r*. The both sleeves 84*r*, 84*l* are then freely moved upwardly within the bores 62*r*, 62*l*. At this time, the sleeves 84*r*, 84*l* and the sliding members 80*r*, 80*l* are guided by the guide rods 72*r*, 72*l* and the guide openings 74*r*, 74*l*, respectively. When the sleeves 84*r*, 84*l* reach the upper ends of the right and left nose pads 60*r*, 60*l*, the upper projections 72*r*, 72*l* of the leaf springs 68*r*, 68*l* are brought into locking engagement with the recesses 88*r*, 88*l* so as to retain the lenses 20*r*, 20*l* in their raised position and allow the near vision fields of the lenses to be located before the eyes of the user. To return the lenses 20*r*, 20*l* to their lowered position, a relatively strong downward pressure is first exerted on the right side of the frame 12 so as to disengage the upper projection 72*r* of the right leaf spring 68*r* from the recess 88*r* of the right sleeve 84*r*. This is because the upper projection 72*r* of the right leaf spring 68*r* provides a greater locking force than that of the left leaf spring 68*l* due to the difference in distance between the upper projections and their associated fulcrum members. A relatively week downward force is then exerted on the left side of the frame 12 so as to disengage the upper projection 72*l* of the left leaf spring 68*l* from the recess 88*l* of the left sleeve 84*l*. In this way, the both lenses can smoothly and simultaneously be moved from their raised position toward their lowered position, as in the previous embodiment. When the sleeves 88*r*, 88*l* reach the lower ends of the nose pads 60*r*, 60*l*, they are brought into locking engagement with the lower projections 74*r*, 74*l* so as to retain the lenses 20*r*, 20*l* in their lowered position.

In the illustrated embodiment, each of the leaf springs has a pair of opposite projections. Alternatively, the lower projections 74*r*, 74*l* of the leaf springs 68*r*, 68*l* may be omitted since the lenses can be retained in their lowered position under gravity. Also, the left fulcrum member 66*l* may be located within the left nose pad 60*l*, such that the distance between the upper projection 72*l* and the fulcrum member 66*l* is greater than that between the lower projection 74*l* and the fulcrum member 66*l*. Similarly, the right fulcrum member 66*r* may be located within the right nose pad 60*r*, such that the distance between the upper projection 72*r* and the fulcrum member 66*r* is less than that between the lower projection 74*r* and the fulcrum member 66*r*.

In the foregoing embodiments, the rims form part of lens holding means. Alternatively, a pair of rimless lenses per se may serve as such a holding means. In such a case, the pad supporting arms may extend rearwardly directly from those rimless lenses.

Although the present invention has been described with respect to its preferred embodiments, it is to be understood that various changes and modifications may be made without departing from the scope of the invention as defined by the appended claims.

What is claimed is:

1. An ophthalmic mounting comprising:

a pair of right and left lens holding means;

a pair of hollow right and left nose pads including a corresponding pair of elongated right and left guide openings, each of said pair of right and left nose pads having an upper end and a lower end;

support means for slidably supporting said pair of right and left nose pads relative to said pair of right and left lens holding means, said support means extending from said pair of right and left lens holding means and including a pair of right and left sliding members freely slid along said pair of right and left guide openings such that at least two different focal fields can be moved into and out of desired position of use; and locking means including a pair of right and left first locking elements located within said pair of right and left nose pads and moved with said pair of right and left sliding members, and a pair of right and left second locking elements located at the upper ends of said pair of right and left nose pads and adapted to cooperate with said pair of right and left first locking elements so as to lock said pair of right and left lens holding means in a raised position.

2. An ophthalmic mounting according to claim 1, wherein said pair of right and left first locking elements include magnets and have different magnetic forces, and said pair of right and left second locking elements are made of a magnetic material.

3. An ophthalmic mounting according to claim 1, wherein said pair of right and left first locking elements are made of a magnetic material, and said pair of right and left second locking elements include magnets and have different magnetic forces.

4. An ophthalmic mounting according to claim 1, wherein said locking means further comprises a pair of right and left third locking elements located at the lower ends of said pair of right and left nose pads and adapted to cooperate with said right and left first locking elements so as to lock said pair of right and left lens holding means in a lowered position.

5. An ophthalmic mounting according to claim 4, wherein said pair of right and left first locking elements include magnets and have different magnetic forces, and said pair of right and left third locking elements are made of a magnetic material.

6. An ophthalmic mounting according to claim 4, wherein said pair of right and left first locking elements are a magnetic material, and said pair of right and left third locking elements include magnets and have different magnetic forces.

7. An ophthalmic mounting according to claim 1, wherein said pair of right and left nose pads include a corresponding pair of substantially cylindrical right and left bores communicated with said pair of right and left guide openings, wherein said pair of right and left sliding members include a corresponding pair of right and left sliding plates moved along said pair of right and left guide openings, and a corresponding pair of substantially cylindrical right and left sleeves connected to said pair of right and left sliding plates and slidably received within said pair of right and left bores, and wherein said pair of right and left first locking elements are in the form of a cylindrical rod and extend through said pair of right and left sleeves.

8. An ophthalmic mounting according to claim 1, wherein said pair of right and left nose pads include a corresponding pair of substantially cylindrical right and left bores communicated with said pair of right and left guide openings, wherein said pair of right and left sliding members include a corresponding pair of right and left sliding plates moved along said pair of right and left guide openings, and a corresponding pair of substantially cylindrical right and left sleeves connected to said pair of right and left sliding plates and slidably received within said pair of right and left bores, wherein said locking means includes a pair of right and left leaf springs having upper and lower ends, and a pair of right and left fulcrum members attached to said pair of right and left nose pads so as to swingably supporting said pair of right and left leaf springs within said pair of right and left nose pads, and wherein said pair of right and left first locking elements include a corresponding pair of right and left recesses formed in said pair of right and left sleeves, and said pair of right and left second locking elements include a corresponding pair of right and left first projections formed in the upper ends of said pair of right and left leaf springs and adapted to engage with said pair of right and left recesses so as to lock said pair of right and left lens holding means in said raised position.

9. An ophthalmic mounting according to claim 8, wherein said locking means further comprises a pair of right and left fourth locking elements, said pair of right and left fourth locking elements including a corresponding pair of right and left second projections formed in the lower ends of said pair of right and left leaf springs and adapted to engage with said pair of right and left recesses so as to lock said lens holding means in a lowered position.

10. An ophthalmic mounting according to claim 9, wherein said right fulcrum member is attached to said right leaf spring at a position closer to the upper end of said right leaf spring than the lower end of said right leaf spring, and said left fulcrum member is attached to said left leaf spring at a position closer to the lower end of said left leaf spring than the upper end of said left leaf spring.

11. An ophthalmic mounting according to claim 9, wherein said right fulcrum member is attached to said right leaf spring at a position closer to the lower end of said right leaf spring than the upper end of said right leaf spring, and said left fulcrum member is attached to said left leaf spring at a position closer to the upper end of said left leaf spring than the lower end of said left leaf spring.

12. An ophthalmic mounting according to claim 9, wherein said pair of right and left nose pads include a corresponding pair of right and left guide rods along which said pair of right and left sleeves are moved between said raised and lowered positions.

13. An ophthalmic mounting according to claim 1, wherein said pair of right and left lens holding means include a corresponding pair of right and left bifocal lenses, said bifocal lenses having a distant field and a near vision field.

14. An ophthalmic mounting according to claim 1, wherein said pair of right and left lens holding means include a corresponding pair of right and left rims, and said support means includes a pair of right and left nose pad supporting arms extending generally rearwardly from said pair of right and left rims and connected to said pair of sliding members.

15. An ophthalmic mounting according to claim 14, wherein said pair of right and left nose pad supporting arms have a generally inverted U-shape.

16. An ophthalmic mounting according to claim 1, wherein said pair of right and left nose pads are interconnected together.

* * * * *